(12) United States Patent
Gallagher et al.

(10) Patent No.: US 6,394,027 B2
(45) Date of Patent: *May 28, 2002

(54) MILKING PARLOR SYSTEMS AND METHODS

(75) Inventors: Jeffrey C. Gallagher, Sedro Woolley; Scott J. Pawlowicz, Burlington, both of WA (US)

(73) Assignee: Blue Diamond Manufacturing Co., Mount Vernon, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,783

(22) Filed: Jun. 16, 1999

Related U.S. Application Data (60) Provisional application No. 60/089,621, filed on Jun. 16, 1998.

(51) Int. Cl.$^7$ ................................................. A01K 1/12
(52) U.S. Cl. ...................................................... 119/14.03
(58) Field of Search ........................... 119/14.01, 14.03, 119/729, 736, 520, 14.18, 14.08, 510

(56) References Cited

U.S. PATENT DOCUMENTS

| | | | | |
|---|---|---|---|---|
| 3,448,725 A | * | 6/1969 | Holm et al. | |
| 3,566,841 A | * | 3/1971 | Gerish | 119/15.15 |
| 3,603,292 A | * | 9/1971 | Finch | 119/14.1 |
| 3,783,830 A | * | 1/1974 | Holm | 119/14.03 |
| 4,000,718 A | * | 1/1977 | Brown | 119/14.03 |
| 4,228,998 A | * | 10/1980 | Trickel | 272/4 |
| 4,951,608 A | | 8/1990 | Reisqies et al. | |
| 5,230,299 A | * | 7/1993 | Moreau | 119/14.03 |
| 5,285,746 A | * | 2/1994 | Moreau | 119/14.03 |
| 5,615,637 A | * | 4/1997 | Nelson | 119/14.03 |
| 5,638,768 A | * | 6/1997 | Moreau | 119/14.03 |
| 5,803,015 A | * | 9/1998 | Rhodes et al. | 119/14.02 |
| 5,908,009 A | * | 6/1999 | Cummings | 119/14.03 |
| 5,970,920 A | * | 10/1999 | Peacock | 119/14.08 X |

* cited by examiner

*Primary Examiner*—Peter M. Poon
*Assistant Examiner*—Jeffrey L. Gellner
(74) *Attorney, Agent, or Firm*—Michael R. Schacht; Schacht Law Office, Inc.

(57) ABSTRACT

A control system for milking parlors. The control system allows the neck rails move from an open position to a predetermined time period after the operator presses an open all gates button. The lowering of the neck rail is restricted or slowed such that the cow has time to exit the milking stall and any contact by the neck rail with the cow is gentle.

18 Claims, 4 Drawing Sheets

MILKING PARLOR SYSTEMS AND METHODS

RELATED APPLICATIONS

This application claims priority of U.S. Provisional Application No. 60/089,621, which was filed on Jun. 16, 1998.

TECHNICAL FIELD

The present invention relates to milking parlors, and in particular to milking parlors in which a series of neck rails are employed to align cows while they are being milked.

BACKGROUND OF THE INVENTION

Milking parlors are designed to allow a large number of cows to be milked in a relatively short amount of time. Prior to being milked, the cows enter a channel and enter milking stalls. While they are being milked, the cows are restrained in the milking stall by neck rails arranged on each side of the cow's neck to form gaps through which the cow's heads extend. The neck rails hold the cows steady while the milk operator attaches milk udder covers. A group of neck rails are connected to work together in what is referred to as a gang. Conventionally, three to four cows are maintained in position by a gang and one to thirty-six gangs make up a parlor.

The neck rails rotate between a closed position and an open position. While the cows are being milked, the neck rails are arranged in the closed position to maintain the cows in the milking stalls. When the milking process is finished, the neck rails are raised into the open configuration to allow the cows to exit the parlor. The neck rails must then be lowered to the closed configuration to prevent the next group of cows from simply walking through and out of the parlor. The neck rails thus further serve as a gate that controls when the cows enter and leave the milking stalls.

Conventionally, neck rails are pneumatically driven into the open position by pressing a first button and into the closed position by pressing a second button. When the neck rails are driven into the closed position, they can potentially hit a slow or confused cow and injure the cow. The milk operator thus must wait for the all of the cows to exit before the neck rails are lowered. Standing by while all cows clear the stall area wastes valuable time during which the milking operator could have been making preparations for the next group of cows entering the parlor.

The need thus exists for milking parlor systems and methods that lessen the likelihood that the cow will be injured while exiting the parlor and that do not require the operator's attention while the cow is exiting the parlor.

SUMMARY OF THE INVENTION

The invention may be implemented in an assembly comprising one or more neck rails rotatably attached to a parlor structure and a pneumatic control circuit that moves the neck rails between open and closed configurations. The neck rails are normally in the closed configuration. The control circuit raises the neck rails into the open configuration; then, after a slight delay, the control circuit automatically lowers the neck rails at a slow rate with minimal downward force. Once all the cows have cleared the milking area and the neck rails have returned to the closed position, the operator presses a second button that locks the neck rails in the down position. Optionally, operation of the second button can also open a gate to let in a new group of cows.

The invention has numerous benefits. Because the neck rails descend in a low force mode, if the cow that has not cleared the range of motion of the neck rail when the rail begins to return to the closed configuration, the neck rail will harmlessly contact the back of the cow. This light contact by the neck rail will encourage the cow to move forward, thereby exiting the milking area. The light contact by the neck rail will, over time, train the cows to quickly leave the milking area.

The milking operator no longer has to sit and wait for the cows to exit and then press a button to lower the neck rails; the operator simply presses a single button to raise the neck rails and then is free to prepare for the next group of cows while the neck rails slowly and safely return to the closed configuration.

DETAILED DESCRIPTION OF THE PREFERRED EMBODIMENTS

Figure 1:
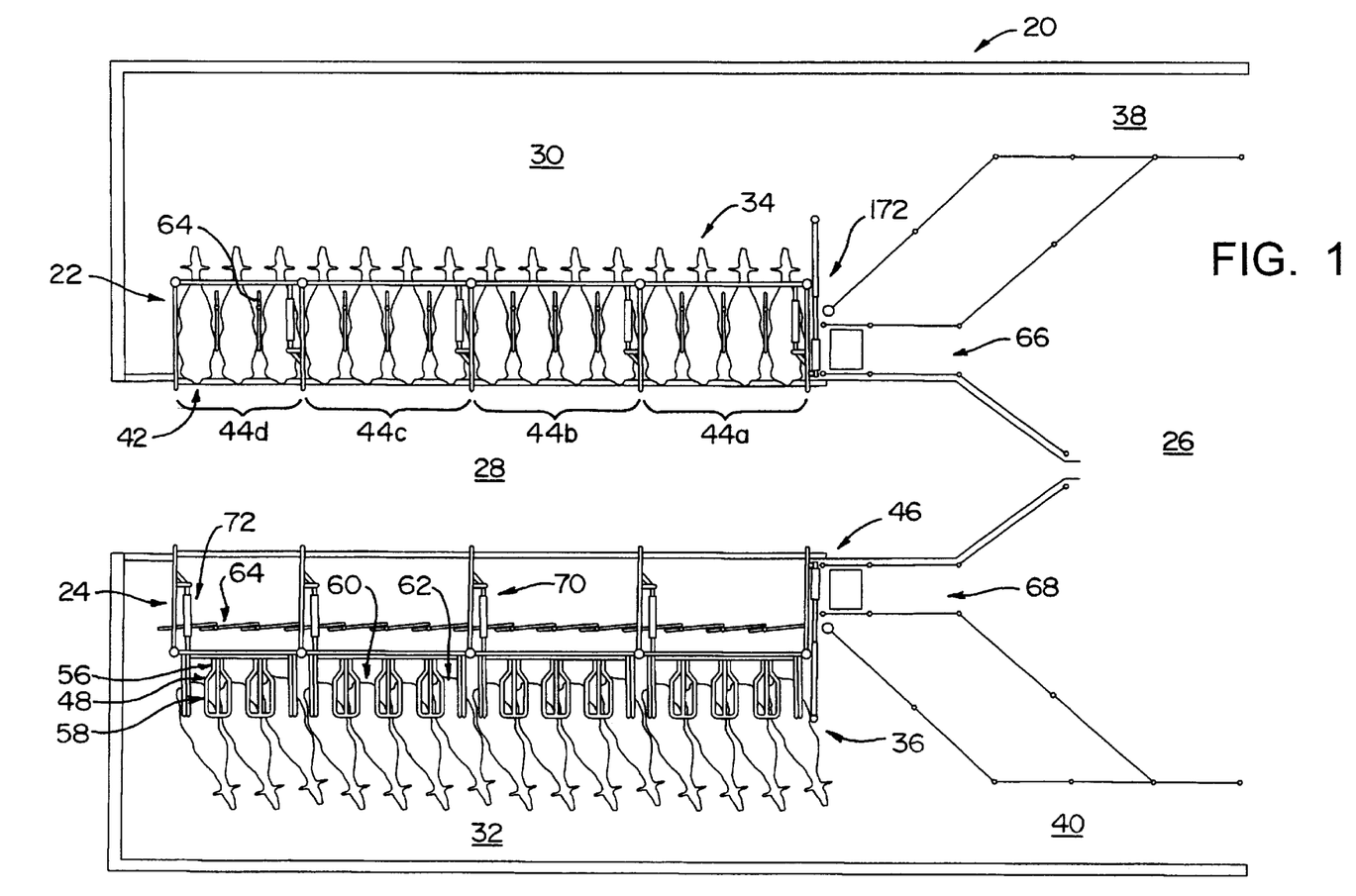
FIG. 1 is a top plan view depicting a milking parlor system constructed in accordance with, and embodying, the principles of the present invention.

Referring initially to FIG. 1, depicted therein is an exemplary milking parlor system 20 containing components and implementing methods that, in varying combinations and sub-combinations, may be constructed in accordance with, and embody, the principles of the present invention. This exemplary system 20 comprises both a mechanical system 22 and a control system 24.

The exemplary control system 24 is a pneumatic system that is integrated with the mechanical system 22 to allow the operator to change the mechanical system 22 without the use of manual force. Other types of control systems, such as hydraulic and/or electrical, may be programmed to perform the function of the exemplary control system 24.

The milking system in which the present invention is embodied may be arranged in a wide number of configurations depending upon such factors as the number of cows to be milked in a day. The exemplary milking system 20 will be described in but one of these many configurations; the present invention may be described in other milking system configurations, however, and the exemplary milking system 20 described herein is not intended to limit the scope of the invention.

The exemplary milking system 20 comprises a cow holding area 26, an operator area 28, first and second cow exit areas 30 and 32, first and second cow milking areas 34 and 36, and first and second cow return lanes 38 and 40. The milking areas 34 and 36 are separated into discrete milking stalls 42. Each milking stall 42 is adapted to position one cow during milking. These milking stalls 42 are arranged in gangs 44.

As perhaps best shown with reference to the uppermost milking area 34 in FIG. 1, these gangs 44 comprise either three or four milking stalls. The exemplary system 20 described herein accommodates fifteen cows per side for a total of thirty cows that could be milked simultaneously. During normal use, however, fifteen cows on one side will be milked while the fifteen cows on the other side are being prepared for milking. Clearly, other configurations of the milking system 20 could accommodate more or fewer cows.

Figure 2:
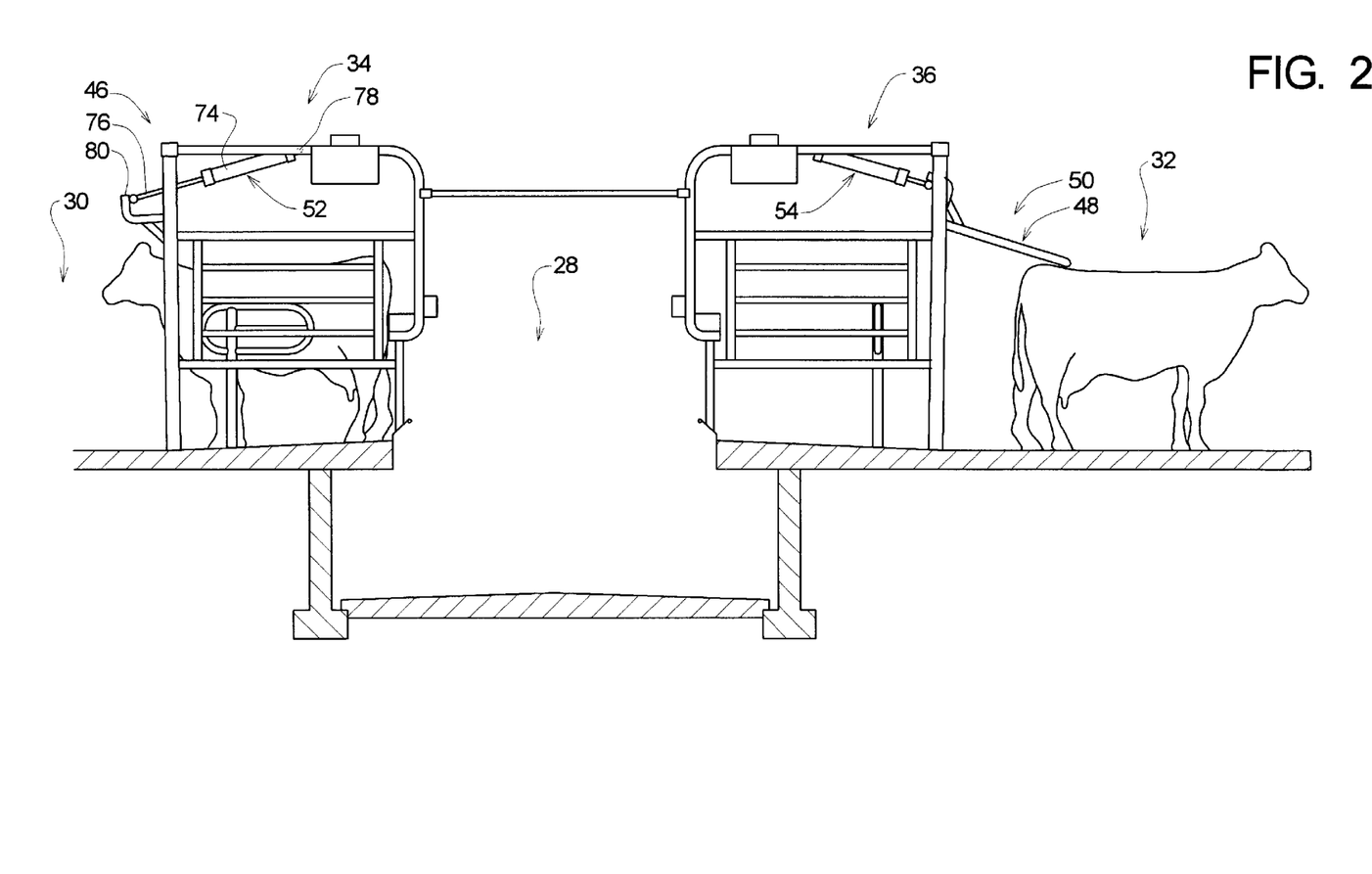
FIG. 2 is an end elevational view depicting the milking parlor of FIG. 1.

FIGS. 1 and 2 show that the mechanical system 22 of the milking system 20 comprises a structural assembly 46 from which a plurality of neck rails 48 are rotatably suspended. The particulars of the structural assembly 46 are not critical to the implementation of the present invention. This assembly 46 will normally take the form of a stable, rigid assembly that is securely attached to the ground and which provides secure attachment points for the various moving components of the system 22.

The exemplary neck rails 48 are each formed as part of a neck rail assembly 50 comprising a plurality of such neck rails. The neck rails 48 are provided between each of the milking stalls 42; with the fifteen milking stalls 42 of the exemplary milking parlor 20, eleven neck rails 48 are provided for each of the milking areas 34 and 36.

The neck rail assemblies 50 comprise neck rails 48 that are attached together in groups corresponding to the gangs 44 described above. As shown in FIG. 1, the gangs 44a–c each comprise three neck rails, while the endmost gang 44d comprises two neck rails.

Within each gang, the neck rails 48 are attached together as the assemblies 50 such that the neck rails 48 of each assembly 50 rotate about a common axis between an open position such as that shown on the right side of FIG. 2 and a closed position such as that shown on the left side of FIG. 2. As will be discussed in greater detail below, the neck rails 48 are moved between the open and closed positions by actuators 52 and 54. The exemplary actuators 52 and 54 are pneumatic cylinders that form a part of the control system 24 and will be described in further detail below.

The exact configuration of the neck rails 48 is not critical to the operation of the present invention. The exemplary neck rails 48 have a generally paddle-shaped configuration with, as shown in FIG. 1, a narrow upper portion 56 and wider lower portion 58. The milking stalls 42 are defined by gaps 60 between adjacent neck rails 48 or gaps 62 between one of the neck rails 48 and a portion of the structural assembly 46.

The milking stalls 42 are further defined by gate assemblies 64. One gate assembly is arranged between each adjacent milking stall 42. Each gate assembly 64 rotates between a channeling position as shown in the lower part of FIG. 1 and a stall position as shown in the upper part of FIG. 1. The gate assemblies 64 are lightly spring biased into the channeling position.

The milking parlor system 20 operates basically as follows. Cows are initially arranged in the cow holding area 26 and enter the milking areas 34 and 36 through milking portals 66 and 68. Usually, each cow is identified as is passes through the portals 66 and 68 so that the milk production of each cow can be monitored and analyzed. As the cows begin entering the milking area, the gates 64 are arranged in the channel configuration as shown in the lower portion of FIG. 1.

In the channel configuration, the gates 64 define an entry channel 70. Cows entering the entry portal 68 pass through this channel 70 to the last milking stall available. The first cow entering the channel 70 moves to the end of this channel and will then turn pass the last gate 64 into an opening 72. The cow passing through this opening 72 will be aligned into the endmost milking stall. As the cow enters this space 72, the gate assembly 64 adjacent thereto swings from the channeling position into the stall position, revealing an opening for the next cow to enter the next adjacent stall 42. This process will be repeated until the cows are aligned as shown in the upper portion of FIG. 1. At this point, the milking equipment is attached to the cows and milking process is performed in a conventional manner.

When the cows are finished being milked, the neck rails are raised to the open position as, shown in the lower portion of FIG. 1, and the cows enter the cow exit area 32 and out the cow return lane 40. As the cows exit the milking stalls, the gates 64 return to their channeling position. And, as will be described in detail below, the neck rails 48 are returned to their closed configuration in preparation for the next group of cows.

As broadly described above, this process of milking cows is generally conventional and has been described primarily for the purpose of giving the reader an understanding of the context in which the present invention is implemented. In the following discussion, after a general explanation of the present invention, the mechanical system 22 and control system 24 will be described in further detail.

In general, the milking system 20 is unique in that the operator need not continually watch the cows while raising and lowering the neck rails. In the preferred embodiment described herein, as the cows are released from the milking stalls 42, the neck rails 48 are raised from the closed position to the open position, held in the open position for a first predetermined time period (e.g., approximately one second), and then allowed to descend automatically under their own weight into the closed position.

The neck rails 48 are not allowed to free-fall into the closed position; rather, the pneumatic system restricts or opposes downward movement of the neck rails 48 such that, when unobstructed, the neck rails 48 move from the open position to the closed position over a second predetermined period (e.g., approximately 5–10 seconds).

The timing sequence described above is preferred, but other timing sequences may be employed when implementing the present invention in a specific environment.

A primary advantage of this system 20 is that the operator need simply push a button to open the neck rails and then need not monitor movement of the cows from that point on. With the neck rails open, the cows will tend to move out of the milking stalls into the cow exit area. If the cows do not clear the range of motion of the neck rails 48 before the neck rails fall, the neck rails will simply lightly contact the back of the cow. This will spur the cow to continue moving out of the milking stalls 42, at which point the neck rails 48 continue to fall into the closed position.

It should be reiterated that, once the operator has pushed the buttons to raise the neck rails, the operator need not, in most cases, monitor the progress of the cows as they enter the cow exit area on the way to the cow return lane. To the contrary, the operator may turn his or her attention to the next group of cows that is to enter the milking area. As compared to conventional milking systems of this type, the present invention significantly reduces the amount of time the operator must spend operating the neck rails and virtually eliminates the possibility that a cow will be injured by a neck rail moving into its closed position. In addition, the contact of the neck rails on the backs of the cows will, over time, have the effect of training the cow to move expeditiously out of the milking stalls and into the cow exit area.

FIG. 2 illustrates that the actuators 52 and 54 comprise a cylinder portion 74 and a shaft portion 76. The shaft 76 is connected within the cylinder 74 to a piston head (not shown). Introduction of pneumatic fluid on one side or the other of the piston head causes the shaft 76 to extend from and retract into the cylinder 74. The cylinder 74 is connected at 78 to the structural assembly 46, while the shaft 76 is connected at 80 to a plurality of neck rails 48. The attachment point 80 is located relative to the axis of rotation of the neck rail 48 such that the neck rail is in its closed position when the shaft 76 is extended from the cylinder 74. This situation is shown at the left side of FIG. 2.

When the shaft 76 is retracted into the cylinder 74, the neck rails 48 are in the open position. The exemplary actuators 52 and 54 are duplex cylinders with two shafts and pistons configured such that only one of the shafts and pistons is operated by the introduction of the pneumatic fluid. As generally discussed above, the function of the actuators 52 and 54 may be performed by a hydraulic system, an electrical system, a mechanical system, or a combination of these systems.

Figure 3:
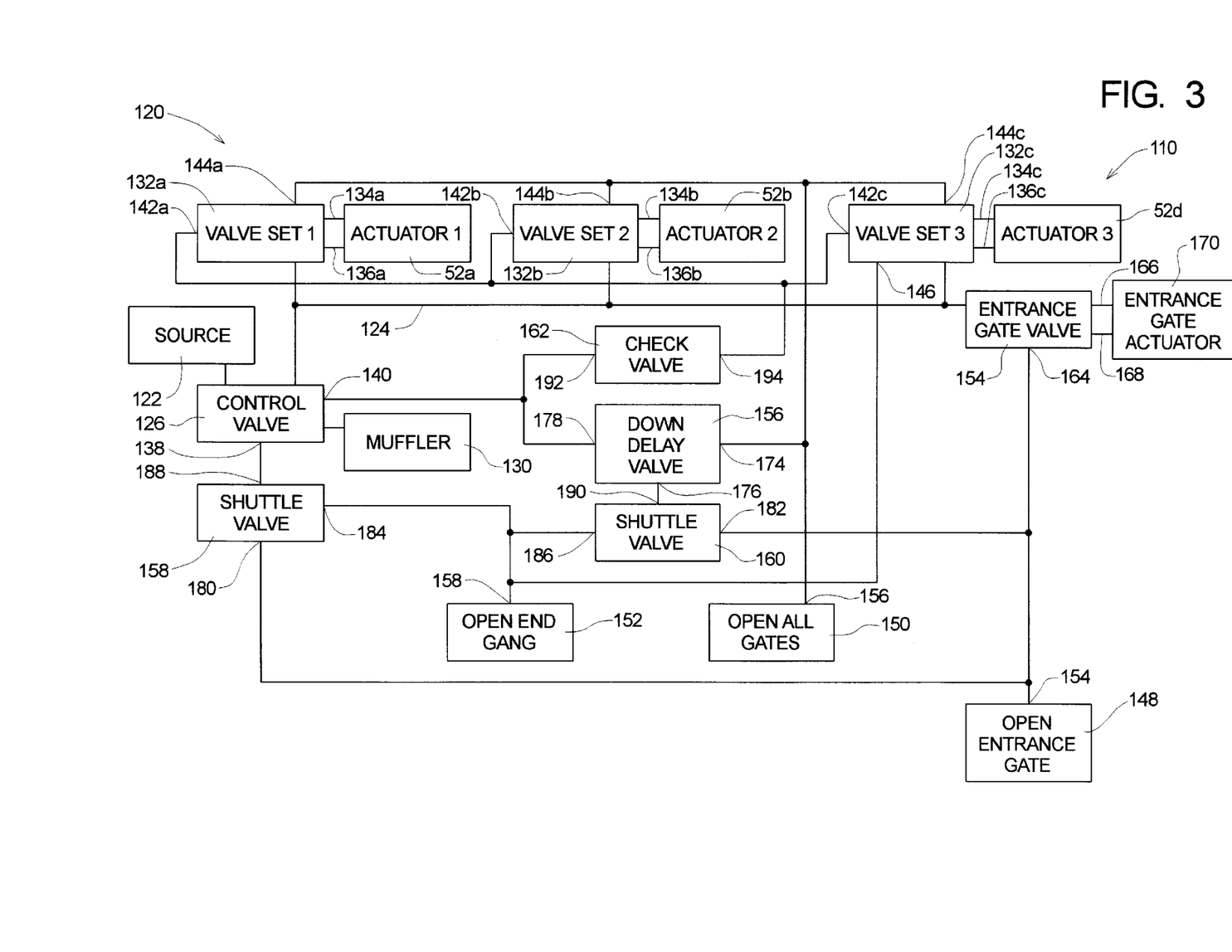
FIG. 3 is a schematic drawing depicting a first exemplary pneumatic power and control circuit that may be used by the milking parlor of FIG. 1.

Referring now to FIG. 3, depicted therein is a schematic drawing depicting a control circuit 110 that may be employed to form the control system 24 that raises and lowers the neck rails 48 in accordance with the principles of the present invention. One such control circuit 110 is provided for each of the milking areas 34 and 36. These control circuits 110 are identical, and only the one associated with the milking area 34 will be described below. Again, these exemplary control systems 24 are pneumatic systems but could be electrical or hydraulic systems or possibly an all-mechanical system.

The exemplary control circuit 110 comprises a power system 120 that supplies motive force, in this case pressurized pneumatic fluid, to the actuators 52. The power system 120 is separable from the logic portion of the control circuit 110, and other types of power and control systems may be used in its place. For example, instead of pneumatic power and control systems, an electrical or hydraulic power and control system may be used to raise and lower the neck rails 48. Adapting the principles of the present invention to another type of power and control system would be routine to one of ordinary skill in the art. In the environment of a milking parlor, however, a pneumatic system is at present the preferred power and control system. The exemplary power system 120 itself is generally conventional and will be described herein only to the extent necessary for a complete understanding of the present invention.

The power system 120 comprises a source 122 of high pressure pneumatic fluid and first, second, and third actuators 52a, 52b, and 52d. It should be noted that, in FIG. 1, four of the pneumatic actuators are shown, while FIG. 3 only depicts three of these actuators. Any number of actuators 52 may be employed depending upon the exact configuration of the milking parlor; FIG. 3 has thus been simplified somewhat in the interests of clarity.

As discussed above, the actuators 52 convert the energy of a pressurized pneumatic fluid into extension or retraction of the shaft 76. The source of pressurized fluid 122 is connected to a high pressure supply line 124 through a control valve 126.

The control valve 126 operates in one of two modes. In a pressurize mode, pressurized fluid is allowed to flow from the source 122 to the supply line 124. In a depressurize mode, pressurized fluid is prevented from flowing from the source 122 to the supply line 124 and any pressure in the supply line 124 is bled off through a restriction such as a muffler assembly 130.

The high pressure supply line 124 is connected to the first, second, and third actuators 52a, 52b, and 52d through first, second, and third valve sets 132a, 132b, and 132c, respectively. The valve sets 132a–c operate in a close mode in which the pressurized fluid is conducted through first supply lines 134a, 134b, and 134c or a open mode in which the pressurized fluid is conducted through second supply lines 136a, 136b, and 136c. The supply lines 134 and 136 are connected to the actuators 52 such that, with the supply line 124 pressurized and the valve sets 132 in the close mode, the actuators 52 force the neck rails into their closed position. And if the supply line 124 is pressurized and the valve sets 132 are in the open mode, the actuators 52 force the neck rails 48 into their open position.

The control valve 126 and the valve sets 132 are controlled by control signals present at various input ports thereof.

The control valve 126 comprises first and second control ports 138 and 140. The control valve 126 is placed into its pressurize mode by applying a momentary pressure at the first control port 138 with the second control port 140 depressurized. The control valve 126 is placed in its depressurize mode by applying momentary pressure to the second control port 140.

The valve sets 132a–c comprise first input ports 142a, 142b, and 142c and second input ports 144a, 144b, and 144c. The third valve set 132c further comprises a third input port 146. The valve sets 132 are placed into the close mode by applying momentary pressure to the first input ports 142 and into the open mode by applying momentary pressure to the second input ports 144. The third valve set 132c may additionally be placed into its open mode by apply momentary pressure to the third input port 146.

The control circuit 110 further comprises an open entrance gate button 148, an open all gates button 150, an open end gang button 152, an entrance gate valve 154, a down delay valve 156, a first shuttle valve 158, a second shuttle valve 160, and a check valve 162.

The buttons 148–152 are connected to a source of pressurized fluid such that, so long as the buttons 148–152 are depressed, pressurized fluid flows out of outlet ports 154, 156, and 158 thereof, respectively. Depressing and releasing these buttons 148–152 will thus generate a momentary pulse of pressurized pneumatic fluid.

The entrance gate valve 154 comprises a control port 164 and is connected to first and second gate supply lines 166 and 168. These gate supply lines 166 and 168 are connected to an entrance gate actuator 170 which opens and closes an entrance gate 172 (FIG. 1). The entrance gate 172 is arranged to prevent or allow passage of cows from the entry portal 66 to the milking area 34.

The down delay valve 156 comprises an initiate port 174, a reset port 176, and an outlet port 178. The down delay valve 156 contains a timer that begins counting down from a predetermined original value when a momentary pressure is applied to the initiate port 174; the timer is reset to the predetermined original value by a momentary pressure applied to the reset port 176. After the timer counts down from its original value, a constant flow of pressurized fluid is generated at the outlet port 178.

The first and second shuttle valves 158 and 160 comprise first input ports 180 and 182, second input ports 184 and 186, and outlet ports 188 and 190, respectively. The shuttle valves 158 and 160 essentially perform the logical "OR"

function, where a pressurized fluid applied to either of the input ports 180,182 or 184,186 is transmitted to the output port 188, 190.

The check valve 162 comprises an input port 192 and an outlet port 194 and allows fluid flow only from the input port 192 to the outlet port 194.

The various components of the control circuit 110 are connected together as shown in FIG. 3 and as will now be described.

The outlet port 154 of the open entrance gate button 148 is connected to the control port 164 of the entrance gate valve 154, the first input port 182 of the first shuttle valve 160, and the first input port 180 of the second shuttle valve 158. The outlet port 156 of the open all gates button 150 is connected to the initiate port 174 of the down delay valve 156 and the second input ports 144 of the valve sets 132.

The outlet port 158 is connected to the third input port 146 of the third valve set 132c, the second input port of the second shuttle valve 160, and the second input port of the first shuttle valve 158. The outlet port 188 of the first shuttle valve 158 is connected to the first control port 138 of the control valve 126. The outlet port 190 of the second shuttle valve 160 is connected to the reset port 176 of the down delay valve 156. The outlet port of the down delay valve 156 is connected to the second control port 140 of the control valve 140 and the input port 192 of the check valve 162. The outlet port 194 of the check valve 162 is connected to the first input ports 142 of the valve sets 132.

The operator operates the control circuit 110 to control the mechanical system 22 in the following manner.

Before a milking session, the cows are all in the cow holding area 26. As will be described in further detail below, the valve sets 132 will be in the close mode at the start of the process. The operator will press the open entrance gate button 82 associated with the milking area 34. This will open the entrance gate 172, reset the down delay valve 156, and apply momentary pressure to the first input port 138 of the control valve 126. When reset, the down delay valve 156 will depressurized the second input port 140 of the control valve 126.

Under these conditions, the control valve 126 is placed into its pressurize mode, thereby allowing pressurized fluid to reach the supply line 124. Because the valve sets 132 are in the close mode, the pressurized fluid will effectively lock the actuators into their closed positions. The cows may thus enter the milking area 34 and align themselves into the milking stalls 42 for milking as generally discussed above.

While the cows in the milking area 34 are being milked, the operator may repeat this process for the milking area 36.

When the milking process in the milking area 34 is finished, the operator presses the open all gates button 150. This applies momentary pressure to the second input ports 144 of the valve sets 132 to place the valve sets 132 into the open mode. At the same time, momentary pressure is applied to the initiate port 174 of the down delay valve 156, which starts the timing function thereof. Before the timer times down, the supply line 124 is still pressurized, so, with the valve sets in the open mode, the actuators 52 move the neck rails 48 into their open position.

The timer in the down delay valve 156 eventually times out over a predetermined delay period determined by the predetermined original value of the timer. In the exemplary system 20, this delay period is approximately two seconds. This delay period can be within a first preferred range of two to seven seconds but, in any event, should be in a range of one to fifteen seconds to avoid unnecessarily slowing down the milking process.

After the timer times down, the down delay valve 156 applies sustained pressure to: (a) the second control port 140 of the control valve 126, which places the control valve 126 into its depressurize mode; and (b) the first input ports 142 of the valve sets 132, which places these valve sets in their close mode.

With the control valve 126 in its depressurize mode and the valve sets 132 in their close mode, the weight of the neck rails 48 will move the neck rails from the open position into the closed position by forcing air out of the actuator cylinders 74 through the supply line 124, the control valve 126, and the muffler 130. The muffler 130 restricts the flow of air out of the system; the size of the muffler restriction is selected such that the neck rails 48 move from their open position to their closed position with a force and over an amount of time that are predetermined to let most cows leave, while gently encouraging (by light contact by the neck rails) slow or confused cows to leave. Any device that restricts the flow of air out of the system may be used instead of the muffler 130, but the muffler 130 is preferred for its sound reducing qualities.

More generally, the muffler 130 may be replaced by other components that perform a similar function depending upon details of the control and power systems used to implement the principles of the present invention. For example, in an hydraulic control system, the function of the muffler may be performed by a nozzle or other device that opposes the flow of hydraulic fluid. In another example, the power system may be an electric motor may be configured to raise the neck rail and then to oppose downward movement of the neck rail by back emf. As yet another example, a mechanical spring may be configured such that it opposes downward movement of the neck rail (and, conversely, assists upward movement of the neck rail). Any of these movement restriction assemblies or systems may be designed to meet timing and control aspects of the present invention.

Often, one or more cows may not leave the milking stalls 42 and enter the cow exit area 30. Instead, these cows may remain within the milking area 34 after the neck rails 48 have returned to their closed position.

In these situations, the operator may press the open end gang button 152. This applies momentary pressure to: (a) the first control port 138 of the control valve 126, which places the control valve 126 in its pressurize mode and pressurizes the supply line 124; (b) the reset port 176 of the down delay valve 156, which resets the timer thereof and depressurizes the second control port 140 of the control valve 126; and (b) the third input port of the third valve set 132c, which places this valve set 132c into its open mode. The first and second valve sets 132a and 132b remain in their close mode.

The valve sets 132a–c are thus now configured to pressurize the first and second actuators 52a and 52b to lock the first, second, and third gangs 44a–c of neck rails 48 into the closed position and pressurize the actuator 52d to place the end gang 44d of neck rails into the open position. The cow is thus encouraged to leave the milking area 34 in the correct direction.

This process is repeated for each milking area 34 and 36 alternately until all of the cows in the cow holding area have been milked. At the end of this process, the neck rails 48 are left in the down position with the valve sets 132 in the close mode ready for the next time the parlor is to be used.

Figures 4, 5, 6:
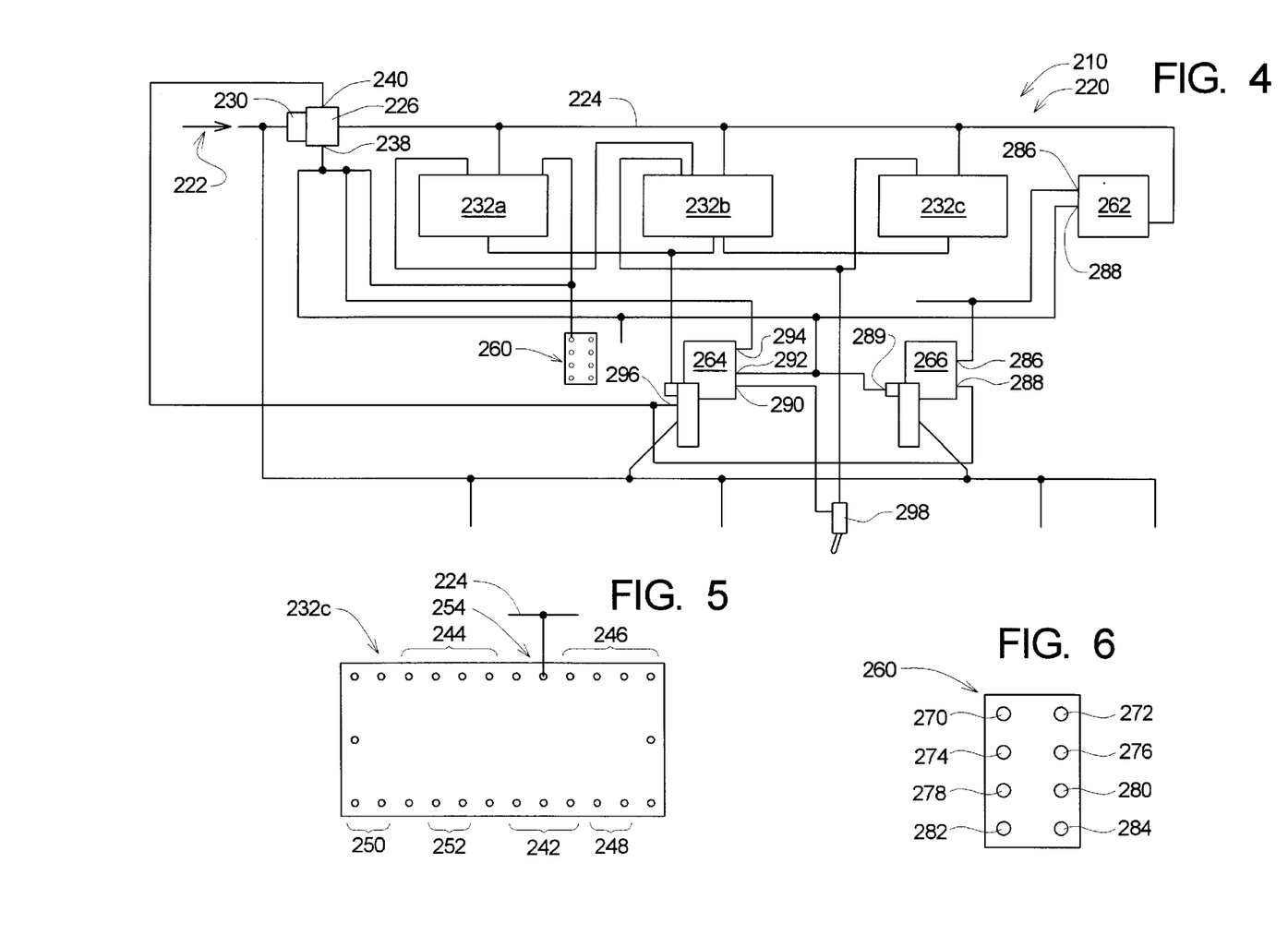
FIG. 4 is a schematic drawing depicting a second exemplary pneumatic power and control circuit that may be used by the milking parlor of FIG. 1.
FIG. 5 is a schematic drawing of a valve set as used in the circuit of FIG. 4.
FIG. 6 is a schematic drawing of a control station as used in the circuit of FIG. 4.

Referring now to FIG. 4, depicted therein is yet another exemplary control circuit 210 that may be used in the milking parlor system 20 embodying the present invention.

The power system 220 comprises a source 222 of high pressure pneumatic fluid that may be connected to one or more pneumatic actuators 52. As discussed above, the circuit 210 may be used to control any number of actuators 52 depending upon the exact configuration of the milking parlor; FIG. 4 is simplified in some respects in the interests of clarity.

As discussed above, the actuators 52 convert the energy of a pressurized pneumatic fluid into extension or retraction of the shaft 76. The source of pressurized fluid 222 is connected to a high pressure supply line 224 through a control valve 226.

The control valve 226 operates in one of two modes. In a pressurize mode, pressurized fluid is allowed to flow from the source 222 to the supply line 224. In a depressurize mode, pressurized fluid is prevented from flowing from the source 222 to the supply line 224 and any pressure in the supply line 224 is bled off through an opening such as the restricted opening formed by a muffler assembly 230.

The high pressure supply line 224 is connected to the actuators 52 through first, second, and third valve sets 232a, 232b, and 232c, respectively. The valve sets 232a–c operate in a close mode in which the pressurized fluid is conducted through first supply lines (not shown) or an open mode in which the pressurized fluid is conducted through second supply lines (not shown). The first and second supply lines are connected to the actuators 52 such that, with the supply line 224 pressurized and the valve sets 232 in the close mode, the actuators 52 force the neck rails into their closed position. And if the supply line 224 is pressurized and the valve sets 232 are in the open mode, the actuators 52 force the neck rails 48 into their open position.

The control valve 226 and the valve sets 232 are controlled by control signals present at various input ports thereof.

The control valve 226 comprises first and second control ports 238 and 240. The control valve 226 is placed into its pressurize mode by applying a momentary pressure at the first control port 238 with the second (ON) control port 240 depressurized. The control valve 226 is placed in its depressurize mode by applying momentary pressure to the second (OFF) control port 240.

Referring for a moment to FIG. 5, an exemplary one of the valve sets 232 is depicted therein; the exemplary valve sets 232 are, but need not be, identical, so only one of these is depicted in FIG. 5.

As shown in FIG. 5, the valve sets 232 comprise a set of ALL DOWN input ports 242, a set of ALL UP input ports 244, a set of GANG UP input ports 246, a set of GANG DOWN input ports 248, a set of INDEX FORWARD input ports 250, a set of INDEX BACK input ports 252, and a power input port 254.

The control circuit 210 further comprises a control station 260 for each gang of the milking parlor system, an entrance gate valve set 262 for the entrance gate of the milking parlor system, a down delay valve set 264, and an entrance gate open delay valve set 266.

FIG. 6 shows that control stations 260 each comprise a plurality of buttons for generating control signals. The destinations of some of these control signals are not shown in FIG. 4, but other control signals are connected to the various valve sets 232 and 262–266 as will be described herein.

The control stations 260 are physically located near the gang that they control and each comprises eight buttons 270, 272, 274, 276, 278, 280, 282, and 284.

The entrance gate valve set 262 is connected between the supply line 224 and an actuator connected to the entrance gate of the milking parlor system. The entrance gate valve set 262 comprises a ENTRANCE GATE CLOSE input port 286, an ENTRANCE GATE CLOSE input port 288, and an ENTRANCE GATE OUTPUT port 289.

The down delay valve set 264 comprises an INITIATE input port 290, a first RESET port 292, a second RESET port 294, and an OUTPUT port 296.

The first two buttons 270 and 272 are the GANG UP and GANG DOWN buttons; these are connected to the ALL UP and ALL DOWN input ports 244 and 242, respectively, of the valve set 232 connected to the gang with which the control station 60 is associated. The second two buttons 274 and 276 are the INDEX FORWARD and INDEX BACK buttons which are connected to other actuators that move the gang forward and back to control the position of the cow within a stall. The third set of two buttons 278 and 280 are ENTRANCE GATE OPEN and ENTRANCE GATE CLOSE buttons that are connected to the ports 288 and 286, respectively, of the entrance gate valve set 262. The fourth set of two buttons 282 and 284 are ALL UP and ALL DOWN buttons that are connected to the ALL UP and ALL DOWN ports 244 and 242, respectively, of the valve set 232 of the gang with which the control station is associated.

The valve sets 232 are daisy chained together, with one being adjacent to the end set (farthest from the entrance gate), one being adjacent to the entrance set (closest to the entrance gate), and the rest being intermediate sets physically located between the end set and the entrance set. Any number of intermediate sets may be used, with one being shown in FIG. 4 for purposes of clarity.

When the ALL UP button is pushed, an UP signal is applied both to one of the ALL UP ports 244 on the valve sets 232 and to the INITIATE port 290 of the down delay valve 264. This causes the gates to be moved into their up position and starts a timer within the down delay valve 264. This signal input to the INITIATE port 290 is passed through a toggle switch 298 that, in one position, can disable the down delay feature described herein. In its other position, the toggle switch 298 enables operation of the down delay circuit.

A predetermined time period after the ALL UP signal reaches the INITIATE port 290, the down delay valve set 264 generates a DOWN signal at its OUTPUT port 296 that is passed to three places. This time period corresponds to the time the gates are to be held in the up position.

This DOWN signal is applied to the one of the ALL DOWN ports 242 of each of the valve sets 232. The valve sets 232 each connect the actuator associated therewith to the control valve 226.

The DOWN signal is also applied to the second control port 240 of the control valve 226. This places the control valve 226 in a mode in which air within the actuators is allowed to escape through mufflers 230; these mufflers 230 restrict the flow of air so that the gates slowly return from their up position to their down position over a predetermined period of time.

The DOWN signal is also applied to the ENTRANCE GATE OPEN port 288 of the entrance gate open delay valve 266, which starts a timer within the entrance gate open delay valve 266. A third predetermined time period after receipt of the DOWN signal, the delay valve 266 generates an ENTRANCE GATE OPEN signal at its OUTPUT port 289, which is applied to the first RESET port 292 of the down delay valve 264, to the ENTRANCE GATE OPEN port 288 of the entrance gate valve set 286, and to the ON port 238 of the control valve 226.

The DOWN signal thus resets the down delay valve set 264, causes pressurized fluid to enter the actuators such that the gates associated with the valve sets 232 are locked into their down position, and opens the entrance gate associated with the valve set 262. The parlor is thus automatically placed in position for the next group of cows to be milked. This third predetermined time period is preferably approximately five seconds, should be within a first range of approximately four to six seconds, but in any event should be between approximately two to fifteen seconds.

Whenever the GANG UP button 272 is pressed, a signal is directed to the ON port 238 of the control valve and to the second RESET port 294 of the down delay valve set 264. This causes the down delay valve set 264 to be reset and energizes the supply line 224 such that the selected gang gate is opened.

The circuit 210 is operated in much the same manner as the circuit 110 described above, except that, with the toggle switch 298 in the right position, the process of raising and lowering the gang gates and the entrance gate is fully automated.

From the foregoing, it should be clear that the present invention may be embodied in forms other than that described above.

What is claimed is:

1. A control system for a milking parlor having a milking stall defined at least in part by a neck rail movable between open and closed positions, where a cow may pass out of the milking stall under the neck rail when the neck rail is in the open position and the neck rail substantially prevents passage of the cow out of the milking stall when the neck rail is in the closed position, the control system comprising:

an actuator assembly operable to move between first and second configurations;

a control assembly operatively connected to the actuator assembly such that operation of the control assembly in the first configuration causes the neck rail to move to the open position, wherein, when attached to the milking stall, the control assembly comprises an open all control that, when initiated, directs the actuator assembly to move the actuator into the first configuration and a timer assembly that, a first predetermined time period after initiation of the open all control, directs the actuator assembly to allow gravity to cause the neck rail to move from the open position into the closed position; and a movement by gravity restriction assembly operatively connected to the neck rail to oppose movement of the neck rail from the open position into the closed position.

2. A control system as recited in claim 1, in which the movement restriction assembly is connected to the neck rail through the actuator assembly.

3. A control system as recited in claim 2, in which:

the actuator assembly comprises an actuator cylinder defining an actuating chamber, where the actuator cylinder raises the neck rail when pressurized fluid is introduced into the actuating chamber and the neck rail lowers when the pressurized fluid is allowed to flow out of the actuating chamber; and the movement restriction assembly comprises a restriction element operatively connected to the actuating chamber to restrict the flow of pressurized fluid out of the actuating chamber.

4. A control system as recited in claim 3, in which the restriction element is a muffler.

5. A control system as recited in claim 1, in which the first predetermined time period is substantially between one and fifteen seconds.

6. A control system as recited in claim 1, in which the movement restriction assembly causes the neck rail to move from the open position to the closed position over a second predetermined time period.

7. A control system as recited in claim 6, in which the first predetermined time period is substantially between one and fifteen seconds and the second predetermined time period is substantially between five and ten seconds.

8. A control system as recited in claim 1, in which the neck rail is one of a plurality of neck rails arranged in gangs of neck rails, where each neck rail is associated with at least one actuator assembly, the control assembly further comprising an end gang initiate assembly that, when initiated, operates the actuator assembly associated with at least a first gang of neck rails such that the neck rails of the first gang are held in their closed positions and a second gang of neck rails such that the neck rails of the second gang are held in their open positions.

9. A control system as further recited in claim 8, in which the milking parlor further comprises an entrance gate to control access to the milking stall, the control assembly further comprising an entrance gate control and an entrance gate actuator assembly for allowing the entrance gate to be raised and lowered, where initiation of the entrance gate control directs the entrance gate actuator to raise the entrance gate and directs the actuator associated with the neck rail to maintain the neck rail in its closed position.

10. A control system as further recited in claim 1, in which the milking parlor further comprises an entrance gate to control access to the milking stall, the control assembly further comprising an entrance gate control and an entrance gate actuator assembly for allowing the entrance gate to be raised and lowered, where initiation of the entrance gate control directs the entrance gate actuator to raise the entrance gate and directs the actuator associated with the neck rail to maintain the neck rail in its closed position.

11. A method of operating a neck rail of a milking parlor, where the neck rail at least partly defines a milking stall, the neck rail is movable between open and closed positions, and a cow may pass out of the milking stall under the neck rail when the neck rail is in the open position and the neck rail substantially prevents passage of the cow out of the milking stall when the neck rail is in the closed position, the method comprising the steps of:

providing an actuator assembly operatively connected to the neck rail to move the neck rail between open and closed positions and to maintain the neck rail in the open position;

operating the actuator assembly to move the neck rail from the closed position to the open position to allow cows to exit the milking stall;

operating the actuator assembly to maintain the neck rail in the open position for a first predetermined time period;

operating the actuator assembly to allow gravity to cause the neck rail to move from the open position into the closed position; and restricting movement of the actuator assembly as gravity moves it from the open position into the closed position.

12. A method as recited in claim 11, in which:

the step of operating the actuator assembly to move the neck rail into the open position comprises the step of introducing pressurized fluid into an actuating chamber of an actuating cylinder; and the step of operating the actuator assembly to allow the neck rail to move from the open position into the closed position comprises the steps of operatively connecting a restriction element to the actuating chamber and allowing the pressurized fluid to flow from the actuating chamber through the restriction element to restrict the flow of pressurized fluid out of the actuating chamber.

13. A method as recited in claim 11, in which the first predetermined time period is substantially between one and fifteen seconds.

14. A method as recited in claim 11, in which the neck assembly moves from the open position to the closed position over a second predetermined time period.

15. A method as recited in claim 14, in which the first predetermined time period is substantially between one and fifteen seconds and the second predetermined time period is substantially between five and ten seconds.

16. A milking parlor comprising:

a structural assembly;

a plurality of neck rails arranged in a plurality of gangs of neck rails to define a plurality of milking stalls, where the neck rails are movable between open and closed positions and a cow may pass out of the milking stall under the neck rail when the neck rail is in the open position and the neck rail substantially prevents passage of the cow out of the milking stall when the neck rail is in the closed position;

an actuator assembly associated with each of the gangs of neck rails, the actuator assembly being operable to move the neck rail between open and closed positions;

a power system that provides power to the actuator assembly;

a control system operatively connected between the power system and the actuator assembly, where the control assembly comprises an open all control that, when initiated, connects the power system to the actuator assembly to move the neck rail into its open position and a timer assembly that, at a first predetermined time period after initiation of the open all control, disconnects the power system from the actuator assembly to allow gravity to cause the neck rail to move from the open position to the closed position over a second predetermined time period; and a movement restriction assembly operatively connected to the actuator assembly to oppose movement by gravity of the neck rail from the open position into the closed position.

17. A control system as recited in claim 16, in which the first predetermined time period is substantially between one and fifteen seconds.

18. A control system as recited in claim 16, in which the first predetermined time period is substantially between one and fifteen seconds and the second predetermined time period is substantially between five and ten seconds.

* * * * *